United States Patent

Schneider et al.

(10) Patent No.: US 9,061,395 B2
(45) Date of Patent: Jun. 23, 2015

(54) AUTOCALIBRATION

(75) Inventors: Gunter Schneider, Marburg (DE); Torsten Gerrath, Marburg (DE)

(73) Assignee: SCHNEIDER GMBH & CO. KG, Fronhausen (DE)

( * ) Notice: Subject to any disclaimer, the term of this patent is extended or adjusted under 35 U.S.C. 154(b) by 274 days.

(21) Appl. No.: 13/581,894

(22) PCT Filed: Mar. 4, 2011

(86) PCT No.: PCT/EP2011/053325
§ 371 (c)(1),
(2), (4) Date: Oct. 18, 2012

(87) PCT Pub. No.: WO2011/107598
PCT Pub. Date: Sep. 9, 2011

(65) Prior Publication Data
US 2013/0055540 A1 Mar. 7, 2013

(30) Foreign Application Priority Data

Mar. 4, 2010 (DE) .......................... 10 2010 010 338

(51) Int. Cl.
*B24B 9/06* (2006.01)
*B24B 49/12* (2006.01)
(Continued)

(52) U.S. Cl.
CPC ....... *B24B 49/12* (2013.01); *Y10T 409/303752* (2015.01); *Y10T 29/54* (2015.01); *B24B 9/148* (2013.01); *B24B 17/06* (2013.01); *B24B 47/225* (2013.01); *G01B 11/24* (2013.01)

(58) Field of Classification Search
CPC ............ B24B 9/06; B24B 9/065; B24B 9/14; B24B 9/148; B24B 13/005; B24B 9/146; B24B 49/12; B24B 49/02; B23Q 17/20; B23Q 17/24; B23Q 17/2471
USPC ........... 451/5, 6, 8, 11, 10, 43, 44, 42, 21, 56, 451/41
See application file for complete search history.

(56) References Cited

U.S. PATENT DOCUMENTS 4,286,415 A * 9/1981 Loreto ............................ 451/43
5,410,843 A * 5/1995 Gottschald ..................... 451/43
(Continued)

FOREIGN PATENT DOCUMENTS

DE 38 27 122 A1 2/1990
DE 197 38 668 A1 3/1999
(Continued)

*Primary Examiner* — George Nguyen
(74) *Attorney, Agent, or Firm* — Hudak, Shunk & Farine Co. LPA

(57) ABSTRACT

A method for calibrating a miffing, cutting or grinding tool of a spectacle lens frame machining unit, for which a) in a first machining step, prior to shaping an edge or surface shape RF by the milling, cutting or grinding tool, the lens is measured by an optical measuring device, b) the shaping of an edge or surface shape RF is carried out by the milling, cutting or grinding tool, c) the generated edge or surface shape RF is measured by the optical measuring device, d) a deviation between the surface or edge shape RF so produced and the desired surface or edge shape target values is determined, and e) the tool is calibrated at least by adjusting the control variables. The invention further relates to a device for the initial working of edges, chamfers and/or grooves at the edges of lenses, wherein an optical measuring system for measuring surface or edge shapes RF and/or edges K of the lens prior to and/or after machining the lens is provided.

8 Claims, 1 Drawing Sheet

(51) Int. Cl.
  *B24B 9/14* (2006.01)
  *B24B 17/06* (2006.01)
  *B24B 47/22* (2006.01)
  *G01B 11/24* (2006.01)

(56) References Cited

U.S. PATENT DOCUMENTS

| | | | | |
|---|---|---|---|---|
| 5,871,391 | A | * | 2/1999 | Pryor ................................. 451/9 |
| 6,071,176 | A | * | 6/2000 | Kruis ................................. 451/5 |
| 6,089,957 | A | * | 7/2000 | Shibata ........................... 451/41 |
| 6,749,377 | B2 | | 6/2004 | Gottschald et al. |
| 7,448,938 | B2 | * | 11/2008 | Inoguchi ........................... 451/5 |
| 8,152,422 | B2 | * | 4/2012 | Bretschneider et al. ...... 409/193 |
| 8,295,961 | B2 | * | 10/2012 | Daimaru et al. ................ 700/98 |
| 8,411,288 | B2 | * | 4/2013 | Schneider et al. ............ 356/621 |
| 2001/0053659 | A1 | * | 12/2001 | Shibata ........................... 451/42 |
| 2002/0022436 | A1 | * | 2/2002 | Mizuno et al. .................. 451/10 |
| 2002/0115389 | A1 | * | 8/2002 | Robinson et al. ............... 451/43 |
| 2004/0106358 | A1 | * | 6/2004 | Tsao et al. ......................... 451/8 |
| 2004/0230335 | A1 | * | 11/2004 | Gerding et al. ............... 700/163 |
| 2006/0276106 | A1 | | 12/2006 | Inoguchi |
| 2010/0141965 | A1 | | 6/2010 | Schneider et al. |
| 2011/0257930 | A1 | * | 10/2011 | Gourraud ...................... 702/150 |

FOREIGN PATENT DOCUMENTS

| | | |
|---|---|---|
| DE | 198 04 455 A1 | 8/1999 |
| DE | 198 31 304 A1 | 1/2000 |
| DE | 100 49 382 A1 | 4/2004 |
| DE | 60 2005 003 012 T2 | 8/2008 |
| EP | 1 250 979 A2 | 10/2002 |
| EP | 2 194 359 A2 | 6/2010 |

* cited by examiner

AUTOCALIBRATION

FIELD OF THE INVENTION

The invention relates to a method for calibrating a miffing, cutting or grinding tool of a spectacle lens edge machining unit.

The invention further relates to a method for the machining of a surface RF or an edge surface RF of a lens by means of a milling, cutting or grinding unit with at least one milling, cutting or grinding tool with cutting geometry, with an optical surface or edge measuring device being provided in the milling, cutting or grinding unit, wherein the surface RF of the lens rotating about an axis of rotation is machined with at least one milling, cutting or grinding tool and a profiled surface shape is generated on the lens by rotating the lens about the axis of rotation and positioning the milling, cutting or grinding tool in a radial or axial direction and, in a further machining step, the thus generated surface shape RF is measured on the work piece by means of the surface measuring device and the degree of variation between the thus generated surface shape RF and the desired surface shape values is then established.

The invention also relates to a device for the shaping of edges, chamfers and/or grooves on the edges of lenses.

BACKGROUND OF THE INVENTION

A method for the autocalibration of a turning tool for lenses is already known from DE 60 2005 003 012 T2. The method provides for the turning of a test piece with non-rotationally symmetrical geometry with a turning tool, the measurement of the cut geometry of the test piece in at least one section with an inclination in a direction of rotation about the turning axis of the work piece, the analysis of the thus obtained measurement data and the undertaking of compensatory regulation.

In U.S. Pat. No. 6,071,176, a calibration method for the driving axles of a grinding machine is described wherein the grinding tool is moved along two axes for the purpose calibrating the particular axis or for the purpose of measuring the particular axis error and a groove is generated, with a variation between the course of the machined groove and a desired measurement for the particular course of the axis being evaluated.

The lens machining unit known from DE 197 38 668 A1 has an end-milling cutter for the complete machining of the edge of a lens. A circumferential groove and a capping bevel are generated on the edge of the lens by means of the end-milling cutter. Alternatively, a combined tool which has various tool components of different forms, e.g. an end-milling cutter and a grinding disc, on a joint shaft is described. The various tool components are used one after the other for the purpose of machining the edge.

From US 2006/0276106 A1, a method for machining the edge of a lens is known, wherein a chamfer is first shaped and the achieved geometry is then measured for the purpose of agreement with the available geometry of the frame. No measurement of the lens takes place prior to the machining of the lens. The same applies in the case of DE 38 27 122 A1.

DE 198 04 455 C2 describes the measurement of the frame as well as the tool prior to the machining of the lens for the purpose of the agreement of the necessary tool movement. No measurement of the lens takes place prior to the machining of the lens.

DE 100 49 382 A1 describes optoelectronic measuring apparatus for the measurement of the geometry of the edges of lenses on the basis of the triangulation method for the purpose orienting the same for insertion in a spectacle frame. This kind of measurement takes place after the lens, including the frame, has been fully machined.

With regard to the precision of the surface, there are far fewer requirements with regard to the edges of lenses than with regard to the optical surfaces, that is to say the front and back themselves. They can, therefore, be brought to the final shape with the desired geometry by means of grinding and/or milling tools.

For the purposes of being received by suitably shaped frames, the edges of lenses sometimes have complex geometries, so that, particularly with the use of classical milling tools such as explained above, several procedural steps are required to produce such complex geometries. For the purpose of reducing machining times, grinding tools whose geometry is at least partially adapted to the complex edge shape RF are also used. As the lenses are made of plastic, tools have a very long life. The technical geometrical data of the tools used such as shaft length, radius, etc. are known or are manually measured prior to installation, so that the relative position of the clamped tool can be established by computer. The lens must only be held over the thus generated edge surface. Closed frames are usually also able to be adapted and are, in the case of plastic, heated for the purposes of inserting the lens, so that there is adaptation to the edge shape RF. The optical properties of the edge surface do not have to be taken into consideration.

SUMMARY OF THE INVENTION

The object of the invention is to develop a method for the machining of the edges of lenses in such a way that an optimal result is ensured.

This object is achieved according to the invention by the method described in the claims, in particular a method for calibrating a milling, cutting or grinding tool of a spectacle lens edge machining unit, comprising the steps of: a) in an initial machining step, measuring the lens with an optical measuring device prior to the shaping of an edge or surface shape RF by the milling, cutting or grinding tool; b) shaping an edge or surface shape RF with the milling, cutting or grinding tool; c) measuring the generated edge or surface shape RF with the optical measuring device; d) establishing a variation between the thus generated surface or edge shape RF and the desired surface or edge shape values; and e) the tool is at least calibrated by adjusting the regulating variables; and a method for machining a surface RF of a lens with a milling, cutting or grinding unit with at least one milling, cutting or grinding tool with cutting geometry, with an optical measuring device being provided in the milling, cutting or grinding unit, comprising the steps of: a) machining the surface RF of the lens rotating about an axis of rotation by at least one milling, cutting or grinding tool and a profiled surface shape is generated on the lens by rotating the lens about the axis of rotation and positioning the milling, cutting or grinding tool in a radial or axial direction; b) in a further machining step, machining the thus generated surface shape RF on the lens with the surface measuring device; c) establishing a degree of variation between the thus generated surface or edge shape RF and the desired surface or edge shape values; d) measuring the lens with the measuring device prior to the shaping of an edge or surface shape RF by the milling, cutting or grinding tool in an initial step which precedes the machining step; and e) adjusting a target data of the machine's control system on the basis of the variation for the purpose of taking account of variations of the tool and optimising the edge or surface shapes RF which are to be generated.

Tactile measuring instruments or surface callipers have been used up until now for the calibration of the tools used. However, only surfaces can be measured with surface callipers. Even if measurement is made close to the edge of the surface, measurement of the linear edge of the surface itself is not possible. In the past, there was also no reason to do this, as adaptation of the spectacle frame was assumed. By applying the method according to the invention, wherein the lens is measured by means of an optical measuring device in an initial machining step prior to the shaping of an edge or surface shape RF by the milling, cutting or grinding tool and an edge or surface shape RF is then shaped by the milling, cutting or grinding tool and the thus generated edge or surface shape RF, particularly the thus generated edges K, is/are measured by means of the optical measuring device, a degree of variation between the thus generated surface or edge shape RF and the desired surface or edge shape values can be established and the tool can thus be calibrated at least by adjusting the target or regulating variables of the control system. In this way, maximum precision is ensured when machining the edges, so that the next adjustment step is made considerably easier.

This procedure on the one hand is based on the method according to the invention, wherein, prior to the shaping of a shape or edge shape RF by the milling or grinding tool, the lens or the semi-finished product which is to be machined is measured by means of the surface or edge measuring device and the actual position of the surfaces and edges K is determined in an initial step which precedes the machining step. The target data of the machine control system are then adjusted on the basis of the degree of variation for the purpose of taking account of variations of the tool and the optimisation of the shape RF which is to be generated.

The geometry of the particular tool cutter could alternatively be established either by means of an optical or a tactile method, so that the shape which can be generated on the work piece would be able to be established by building upon this. With such a method, however, other influences on the shape which is ultimately able to be generated would not be taken into account, for example the bending or deformation of the work piece or the tool as a result of the cutting load and/or existing oscillations of both the tool as well as the work piece.

According to the invention, all factors relating to the tool which have an influence on the shape of the surface or edge which is ultimately generated are taken into consideration, so that an optimal machining result is obtained. Factors which affect the work piece such as variations in the shape or the chucking or the position can be taken into account by this kind of measurement. There are also advantages associated with the particular tool set-up process, which can be considerably quicker and in particular more accurate when the actual tool geometry is known.

On the other hand, it is necessary according to the invention to have a device for the shaping of edges, chamfers and/or grooves on the edges of lenses, a so-called edger, which has an optical measuring system for the measurement of the surfaces and/or edges K of the lens, which ensures measurement prior to and/or after the machining of the lens. Of particular benefit is the measurement of the edges K of one or at least a part of the available surfaces, which is ensured by a system which operates according to the principle of an optical micrometer.

For this, it can be advantageous if the establishment of the degree of variation is able to be carried out separately for the particular milling, cutting or grinding tool. In this way, any possible variations can be established for each tool separately, which can be difficult in the event of an accumulation of variations of several tools.

It can also be of benefit if the establishment of the degree of variation for the tool is repeated only once, after the insertion of the latter in the milling, cutting or grinding machine, or twice a day, once a day, every two days or after a particular number of machined work pieces. Thus, other influences on the generated shape RF or the edge shape RF, for example signs of wear and tear on the tool, can be detected.

It can also be of benefit if the existing variations between the surface or edge shape RF and the desired form are specified in terms of the following causes:
1) oscillations of the tool and/or work piece;
2) error of an axis of movement;
3) existing wear and tear of the tool or a tool cutter or of the cutting or grinding geometry and/or
4) deformation of the lens as a result of the chucking.

If there were variations in the relative position between the overall generated shape RF and the lens, these would have their origins in an error of one or more of the axes of movement according to item 2). If the generated grooves or chamfers have ripples, which can be confined to various geometrical components of the shape RF, this indicates a cause of type 1). A cause of type 3) also results in variations in one or more geometrical components of the shape RF, as the tool used in each case has signs of wear and tear. In particular, the corners or internal edges generated are not as required; i.e. the internal radius is too large as the edge of the tool has been subjected to too much wear and tear. If a cause of type 4) occurs, because the lens is deformed within the axial chucking, there will particularly be variations in the geometrical components which are most severely bent.

Provision can advantageously be made for the roughness of the surface to be at least partially recorded or established for the purpose of specifying the cause "wear and tear of tool cutter" and for the tool to be regarded as "requiring grinding" or "replacement" if a particular threshold value of surface roughness is exceeded. With the exception of the corners of the tool, wear and tear on the tool cutters would be less easy to establish by means of the above assessment of the shape RF or the geometrical components. The assessment of the surface roughness is a more tried and tested way of doing this.

It can also be advantageous for a lens or a test disc to be used as a work piece or for the test disc to have a cylindrical shape. The profile of the edge shape RF which is to be generated is two dimensional depending on the flat circumferential geometry of the cylinder; i.e. relative movement between the tool and the work piece in a direction parallel to the axis of rotation of the work piece is lacking in this case. This is accompanied by a simplified recording and evaluation of the edge shape RF, as existing variations in the shaped geometry from the desired form can be evaluated more easily because of the flat, cylindrical shape. Easier evaluation is, however, possible with the use of lenses with a simpler geometry which have e.g. a correspondingly circular ring edge surface. In principle, however, evaluation is also possible in the case of lenses which have a spatially bent surface RF or edge shape RF.

BRIEF DESCRIPTION OF THE DRAWINGS

Other benefits and details of the invention are explained in the patent claims and in the description and are shown in the figures.

DETAILED DESCRIPTION OF THE INVENTION

Figure 1A:
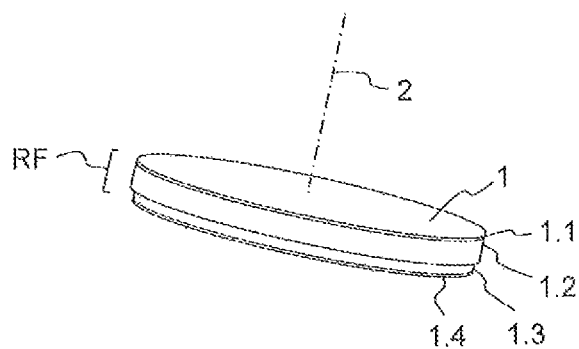
FIGS. 1a-1d show various sketches of the principles underlying various errors.

A specific kind of shape RF is the edge shape RF of a lens 1 with a rotation of axis 2. The edge shape RF according to FIG. 1a or FIGS. 1b-1d has four surface shapes or geometrical components 1.1-1.4, which are limited by an edge K in each case. The edge K is part of the particular surface or edge shape RF. A first chamfer 1.1 on the edge, a first coaxial surface component 1.2, a groove 1.3 and a second chamfer 1A. Contrary to the representation, the lens 1 is not usually rotationally symmetrical after the machining of the edge.

Figure 1B:
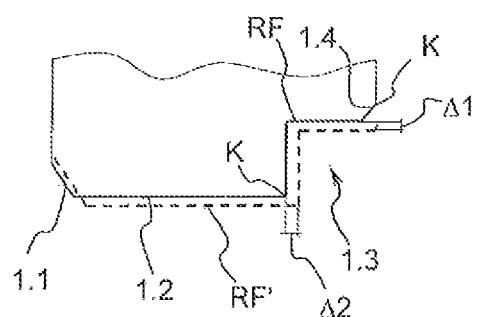

According to FIG. 1b, the relative position of an edge shape RF' as a whole, that is to say with all geometrical components 1.1-1.4, has a variation $\Delta 1$ in a radial direction and a variation $\Delta 2$ in an axial direction measured from the edge K in each case. This can be attributed to a cause of type 2) in the description section, according to which errors are present in the axes of movement. The available diagram is of a summary nature. There can also be errors in only one axis and variations resulting from this.

Figure 1C:
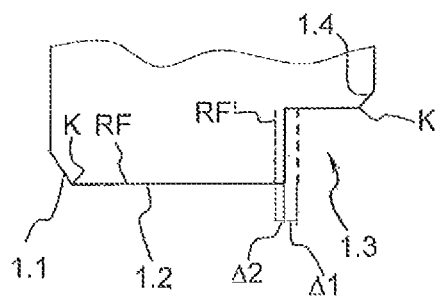

According to FIG. 1c, the geometrical component 1.3 of the edge shape RF', that is to say groove 1.3, has variations $\Delta 1$ and $\Delta 2$ over the circumference in an axial direction, which is ultimately a reason for the ripples in the sides of the grooves over the circumference and can be attributed to a cause of type 1), namely oscillations of the tool in an axial direction.

Figure 1D:
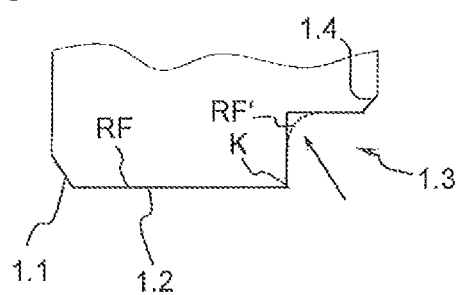

According to FIG. 1d, a radius R of the generated internal corner of the edge shape RF' is undefined and too large. This indicates a cause of type 3), according to which the milling or grinding tool has signs of wear and tear in the region of the corner.

The variations described above by way of an example can also occur in various partial combinations. The accompanying patterns of variations are superseded accordingly.

LIST OF REFERENCE NUMERALS 1 lens
1.1 first chamfer
1.2 first coaxial surface component
1.3 groove, second coaxial surface component
1.4 second chamfer
2 axis of rotation.
K edge
R radius
RF shape, edge shape, surface shape, edge surface
RF' shape, edge shape with variations $\Delta 1$ and $\Delta 2$
$\Delta 1$ variation
$\Delta 2$ variation

The invention claimed is:

1. A method for machining a surface RF of a lens with a milling, cutting or grinding unit with at least one milling, cutting or grinding tool with cutting geometry, with an optical measuring device being provided in the milling, cutting or grinding unit,
   comprising the steps of:
   a) measuring the lens with the measuring device prior to shaping of an edge or surface shape RF by the milling, cutting or grinding tool in an initial step;
   b) machining the surface RF of the lens rotating about an axis of rotation by at least one milling, cutting or grinding tool and a profiled surface shape is generated on the lens by rotating the lens about the axis of rotation and positioning the milling, cutting or grinding tool in a radial or axial direction;
   c) in a further machining step, measuring the thus generated surface shape RF on the lens with the surface measuring device;
   d) establishing a degree of variation between the thus generated surface or edge shape RF and the desired surface or edge shape values;
   e) adjusting a target data of the machine's control system on the basis of each of the i) measuring of the lens prior to the shaping of the edge or the surface shape RF, and ii) establishing the degree of variation for the purpose of taking account of variations of the tool and optimising the edge or surface shapes RF which are to be generated.

2. The method according to claim 1, wherein a degree of variation is established separately for the particular milling, cutting or grinding tool.

3. The method according to claim 1, wherein the establishment of a degree of variation for the particular milling, cutting or grinding tool is repeated:
   only once, after the insertion of the same in the milling, cutting or grinding machine or
   twice a day, once a day, every two days or after a particular number of machined lenses.

4. The method according to claim 1, wherein existing variations between the surface or edge shape RF and the desired shape are specified in terms of the following causes:
   oscillations of the tool and/or lens;
   error of an axis of movement;
   existing wear and tear of a tool and/or
   deformation of the lens as a result of chucking.

5. The method according to claim 4, wherein a surface roughness of the surface or edge surface is also at least partially established for the purpose of specifying the cause "wear and tear of tool cutter" and the tool is regarded as "to be ground" or "to be replaced" when a particular threshold value for the surface roughness of the tool is exceeded.

6. The method according to claim 1, wherein a lens or a test disc is used as a work piece.

7. The method according to claim 5, wherein the test disc is cylindrical.

8. The method according to claim 1, wherein a degree of variation is established separately for the particular milling, cutting or grinding tool, wherein the establishment of a degree of variation for the particular milling, cutting or grinding tool is repeated:
   only once, after the insertion of the same in the milling, cutting or grinding machine or
   twice a day, once a day, every two days or after a particular number of machined lenses,
   wherein existing variations between the surface or edge shape RF and the desired shape are specified in terms of the following causes:
   oscillations of the tool and/or lens;
   error of an axis of movement;
   existing wear and tear of a tool and/or
   deformation of the lens as a result of chucking, and
   wherein a surface roughness of the surface or edge surface is also at least partially established for the purpose of specifying the cause "wear and tear of tool cutter" and the tool is regarded as "to be ground" or "to be replaced" when a particular threshold value for the surface roughness of the tool is exceeded.

* * * * *